P. H. THOMAS.
SYSTEM AND METHOD OF ELECTRICAL DISTRIBUTION.
APPLICATION FILED DEC. 8, 1906.
968,896.
Patented Aug. 30, 1910.
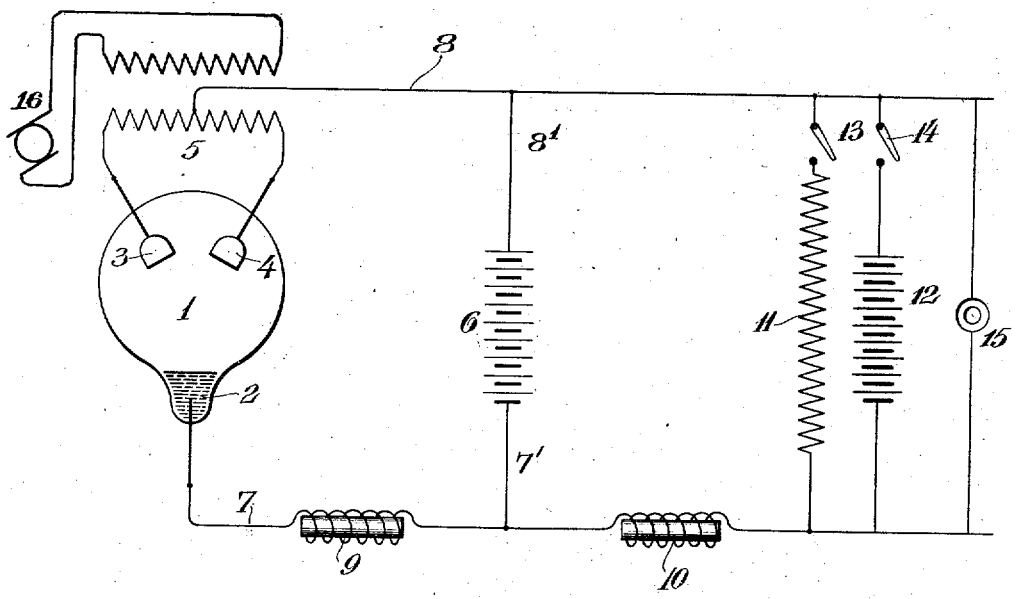
Witnesses
Chas. F. Clagett
Thos. H. Brown
Inventor
Percy H. Thomas.
By his Attorney
Charles A. Terry

UNITED STATES PATENT OFFICE.

PERCY H. THOMAS, OF MONTCLAIR, NEW JERSEY, ASSIGNOR TO COOPER HEWITT ELECTRIC COMPANY, OF NEW YORK, N. Y., A CORPORATION OF NEW YORK.

SYSTEM AND METHOD OF ELECTRICAL DISTRIBUTION.

968,896.     Specification of Letters Patent.     Patented Aug. 30, 1910.

Application filed December 8, 1906. Serial No. 346,847.

*To all whom it may concern:*

Be it known that I, PERCY H. THOMAS, a citizen of the United States, and resident of Montclair, county of Essex, State of New Jersey, have invented certain new and useful Improvements in Systems and Methods of Electrical Distribution, of which the following is a specification.

My invention relates to certain new and useful improvements in apparatus and methods for maintaining an approximately uniform supply of energy to a consumption circuit, where the energy is derived from a source of varying electromotive force, employed in connection with storage batteries in such manner that the latter are continuously connected with the consumption circuit and with the source of supply so as to act as a receiver of energy, receiving and giving off energy according to the variations of the source and of the demands of the consumption circuit.

My invention is particularly applicable where the variations of the source are extremely wide, as in the case of an alternating source used in connection with a converter or rectifier, or where the nature of the use is such that even small fluctuations of voltage or current in the consumption circuit would be very disadvantageous, as in the case of telephone systems.

The object of my invention is to minimize fluctuations and to approximate uniform constant voltage in the consumption circuit, as nearly as may be desired.

In the specific embodiment of my invention, shown in the drawings, I effect the desired result by adding a reactance in the path of flow of current from the storage battery to the consumption circuit and, beyond such reactance, a shunt connection across the circuit, of such a character as to afford a shunt path for fluctuations in the consumption circuit. The reactance is an inductance and the shunt path for the fluctuations is a noninductive resistance or, if desired, it may be a second storage battery similar to that first mentioned.

In the drawings the figure is a diagrammatic view of my apparatus for this purpose.

The converter or rectifier 1, having a negative electrode 2 and positive electrodes 3 and 4, is supplied with current from the divided secondary 5 of a transformer, connected with any suitable source of alternating current 16. The apparatus indicated in the drawing is a single phase, but invention applies equally to polyphase and other sources of varying electromotive force. The converter is operatively connected with a storage battery 6, which is connected across the two sides 7 and 8 of the supply circuit. The conductor 7 extends from the negative electrode 2, of the converter, and is connected by conductor 7' to one terminal of the battery 6. The conductor 8 extends from an intermediate point of the divided secondary 5, and is connected by conductor 8' to the other terminal of the battery.

The inductance 9 is arranged in the conductor 7 leading from the negative electrode for the purpose of maintaining the current and thereby maintaining the converter in conducting condition. The current from the secondary flows through the converter in one direction only, entering the same alternately, first from one positive and then from the other. This gives a uni-directional current varying in value from zero to the maximum. The inductance 9 seems to smooth out these fluctuations to a considerable extent and to cause a more uniform flow of current in the converter, in the consumption circuit and in the storage battery connected across the same, but I find that an enormous inductance at 9 is necessary to smooth out the current sufficiently for the class of uses first above referred to, and my present invention contemplates an arrangement whereby a much smaller inductance will produce a more satisfactory result. I accomplish this by making the device 9 of moderate inductance and providing a second inductance 10 in the line beyond the point where the storage battery (6) is bridged across the same. This second inductance serves to further smooth out the fluctuations of current passing to the line, but the use of such second inductance 10 has some tendency to produce a constant current effect in the line. This is undesirable for the purposes referred to, which require a uniform voltage. This constant current tendency may be compensated for and corrected to a considerable extent by the use of a shunt resistance 11 across the circuit at a point beyond the inductance 10. This resistance furnishes a noninductive path for current fluctuations and operates to shunt the same across the line, thereby tending to prevent the constant current tendency of inductance coils 9 and 10 from producing improper or undesired operation of the telephone instruments 15 or other translating devices employed on the consumption circuit.

While the divided inductance is of considerable efficiency in connection with the shunt resistance, I prefer to employ it in connection with a yet more efficient arrangement, which consists of a second storage battery 12 in parallel to said first mentioned storage battery 6, of substantially the same voltage and preferably similar thereto in all respects. This second battery 12 is bridged across the line at a point beyond the inductance 10 and like the resistance 11 furnishes a noninductive shunt path for fluctuations. It is of lower resistance, however, and is far more efficient. In designing this converter-secondary battery supply system, the batteries 6 and 12 may be of full size and capable of storing a considerable amount of energy, or, if large storage capacity is not required, both batteries may be made of small size cells, or battery 6 may be made up of cells of large storage capacity and battery 12 of cells of small storage capacity, but in the latter case, of course, the number of cells must be the same or in any event the average voltage across 12 must be equal to the average voltage across 6.

If desired the system may be provided both with the resistance 11 and with battery 12, as shown in the drawings. In such case either or both of these shunt paths for the fluctuations may be employed. For instance, the resistance 11 may be thrown in by switch 13, while battery 12 is cut out by switch 14 for purposes of repair or renewal.

In operation of the system the inductance 10 in the path of flow of current from the storage battery 6 to the consumption circuit serves to steady and maintain the flow in that direction. Fluctuations in the consumption circuit due to changes of resistance therein, particularly the abrupt fluctuations of telephone transmitters, cannot readily travel back through the inductance 10 to shunt across the battery 6, the inductance acting as a choke coil to prevent this. In my system the noninductive resistance 11 and the battery 12 furnish paths of low impedance for such fluctuations or tendencies to fluctuate. By those means difficulties resulting from fluctuations, whether originating in the source of supply or in the consumption circuit, are completely obviated; that is to say, the objectionable fluctuations from the source are completely smoothed out, while the useful fluctuations due to changes of resistance or of electromotive force originating in the consumption circuit, are permitted to develop naturally and are efficiently transmitted on the line, as is necessary for the purposes and uses first above mentioned.

I claim:

1. A circuit and a source of fluctuating electromotive force, in combination with a storage device bridged across the circuit and adapted to store electrical energy and to restore the same at a critical electrical pressure, a reactance in the path of current flow of said storage device, and a noninductive shunt containing a source of electromotive force counter to that of the source, bridged across the circuit beyond said inductance, for the purpose described.

2. A circuit, a source of alternating electromotive force, a vapor rectifier, and a storage battery bridged across the circuit, in combination with an inductance in the path of flow of current of said storage battery, and a second storage battery beyond said second inductance in parallel with said first mentioned battery and of substantially the same average voltage across the terminals.

3. A circuit, a source of alternating electromotive force, a vapor rectifier, and inductance in the lead from the negative electrode of said rectifier, and a storage battery bridged across the circuit beyond said inductance, in combination with a second inductance in the path of flow of current of said storage battery, and a second storage battery beyond said inductance in parallel with said first mentioned battery and of substantially the same average voltage across the terminals.

Signed at New York in the county of New York, and State of New York, this 5th day of December A. D. 1906.

PERCY H. THOMAS.

Witnesses:
WM. H. CAPEL,
THOS. H. BROWN.